June 14, 1938.  A. D. NIEDING  2,120,710
EDIBLE CONTAINER
Filed Feb. 18, 1937
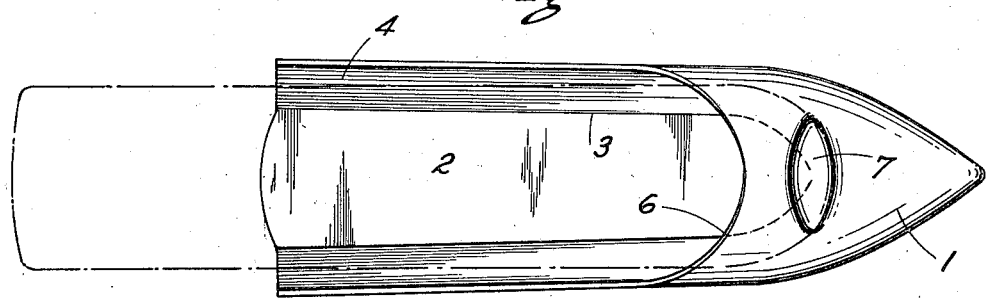
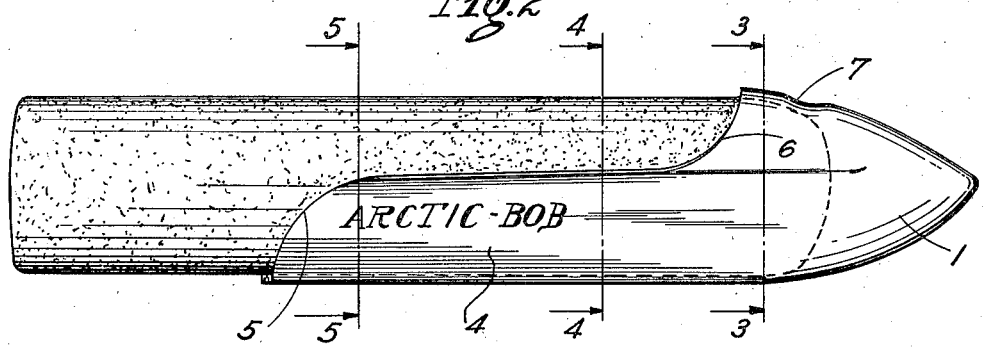
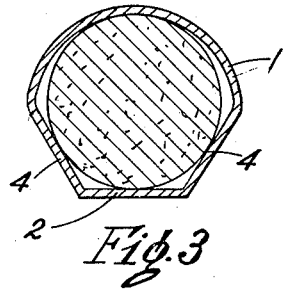 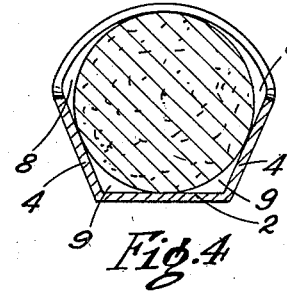 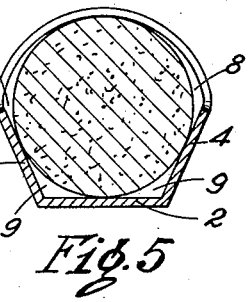
INVENTOR.
ARTHUR D. NIEDING
BY
ATTORNEYS Patented June 14, 1938

2,120,710

UNITED STATES PATENT OFFICE 2,120,710

EDIBLE CONTAINER

Arthur D. Nieding, Vermilion, Ohio

Application February 18, 1937, Serial No. 126,366

4 Claims. (Cl. 99—88)

This invention relates to improvements in containers or holders for confections, and more particularly to an edible container for ice cream or the like.

Heretofore containers for ice cream have consisted principally in the conventional pastry shells called "cones" which were hand filled with the ice cream by the use of ice cream scoops or dippers. One common method of filling such cones is to force a dipper of ice cream in the cone proper and then place a second dipper of ice cream on top of the first; the idea being to provide a greater volume of content to the purchaser as well as to show the purchaser that he is obtaining a greater volume. Such cones, especially in the hands of children, often when tilted, discharge their contents to the extreme chagrin and sometimes embarrassment of the purchaser. Once filled there was no manner in which the purchaser could lay down his confection without loss of contents other than into a tray made especially to receive the cones; obviously such trays are ordinarily not found except at the place of purchase. In applying the first scoop of ice cream the cones are often broken and are rendered useless resulting in a total loss of that particular container.

By my present invention, I have provided a container which may be quickly and easily filled with ice cream by the usual dipper method or by a preformed bar or the like.

Furthermore the shape is such that substantially the entire contents of the container are visible to the purchaser and the contents may be made especially attractive to the eye by the arrangement thereof in the container. The container is so designed that it may be readily held in the hand and easily eaten from without danger of loss of its contents; and provision is made so that if the contents melt they do not drip upon the purchaser or elsewhere, but are caught and retained by the container itself. It is also possible to lay the container down without its contents falling out of the container and without danger of the container rolling off of the place where it is laid.

Still other advantages and improvements of the invention over those of the prior art will become more apparent by reference to the following description of an embodiment thereof which description is illustrated by the accompanying drawing.

In the drawing:

Fig. 1 is a plan view of my container with a bar of confection therein shown in dot and dash lines;

Fig. 2 is a longitudinal elevation of the container and contents;

Figs. 3, 4, and 5 are sections taken on the lines 3—3, 4—4, and 5—5 of Fig. 2, looking in the direction of the arrows.

Referring now to the drawing throughout which like parts have been designated by like reference characters; a handle portion 1 is provided and includes a hollow end or socket of generally circular or oval cross section having converging walls terminating in a relatively blunt point.

One side of the socket is provided with a longitudinal extension or lip which may comprise a flattened bottom portion 2, the lateral edges 3 of which are bordered by upwardly extending divergent sides 4. The bottom and sides are designed to merge smoothly with the socket portion and the end extremities of the sides curve downward to the bottom as at 5. The other ends sweep upward at 6 to provide a cowl shaped connection with the socket. As will be noted in Figs. 2 to 5 inclusive, the device is slightly wider at the open end of the lip and the edges of the bottom and the sides converge slightly toward the end 1 which thus facilitates stacking of the containers in the usual manner.

Generally the article may be said to be streamlined or in the shape of a miniature bob sled. The sides 4 are sufficiently flat to allow a trade name to be impressed in or molded upon the surface thereof as best shown in Fig. 2.

The container may be filled with bulk ice cream by using the ordinary ice cream dipper and placing one of the balls of ice cream in the socket portion and one or more other balls adjacent the same along the lip or trough.

The sales appeal of such confection may be increased by supplying different colors of ice cream and when so supplying, the purchaser may partake of any flavor he desires without disturbing the others.

Another highly desirable manner of filling the containers is shown in the drawing wherein a preformed cylindrical bar of ice cream is provided. In this instance the bar of ice cream need merely be taken from the freezer and placed in the socket with the body lying in the trough.

Still another method of preparing the confection for sale is to fill the container with the ice cream as it comes from the mixer in a semisolid state and then place the filled container in a freezer where it is frozen solid.

As best shown in Figs. 1 and 2, I also contemplate forming the socket with one or more slightly depressed zones such as 7 which afford a more secure grip for the fingers on the socket or handle portion.

It will also be noted, particularly from Figs. 3 to 5 inclusive, that when a preformed bar is used, the sides of the bar lie tangential to the bottom and sides of the container leaving open spaces such as at 8 and 9 at the intersection of the sides and bottom and at the juncture of the sides with the cowl. Thus when the ice cream melts these spaces provide passages which permit and guide the fluid ice cream down into the socket portion 1 where it is caught.

It will thus be seen that I have provided an edible container where the actual pastry content may be somewhat smaller than the ordinary cone and yet where it can hold fully as much or more ice cream and with more safety than the conventional type. The devices may be readily stacked awaiting use and the vender need only extract a bar of ice cream from the freezer and insert the same into the socket before handing the finished confection to the customer.

On the other hand the customer can see practically all the ice cream he is obtaining and is readily impressed with its bulk and coloration. Having once purchased the confection, it is not necessary to hold the same in his hand until eaten, since he can readily lay it down and the flat bottom prevents the same from rolling. The lip furnishes a firm lateral support for bar and still does not hide the contents, and the general design is such that it is substantially dripless.

Having thus described my invention, I am aware that numerous and extensive departures may be made therefrom without departing from the spirit and scope of the invention, and that the forms shown are for the purpose of illustration, rather than limitation.

I claim:

1. A receptacle comprising an edible container having a socket at one end for receiving a bar of confection, a lateral support for the bar extending from the socket longitudinally of the receptacle, and having upwardly extending sides to retain and guide melting portions of the bar into the socket, said socket being provided with an inwardly extending portion spaced from the end to prevent the fingers from slipping off the end.

2. In an article of manufacture, an edible container including an end socket of generally cone shaped contour for receiving a confection, a lateral support for said confection open throughout most of its length comprising a bottom wall extending longitudinally and in prolongation of one side of said socket and having upwardly extending diverging walls adjacent each side adapted to support the confection on three sides, said bottom and end walls being substantially flat from the extremities up to the point where they merge with said socket, a depressed zone formed in the wall of said socket to provide a finger grip spaced from the end of the socket.

3. In an edible container for ice cream confections and the like, including a hollow end socket, the walls of which converge to a pointed end, a lateral support for the confection open throughout most of its length extending beyond the socket comprising a flat portion merging with the socket and extending longitudinally away from the socket and having edges which converge toward the socket, a pair of walls disposed on opposite sides of said flat portions and extending upwardly from said flat portion and diverging from each other, said walls adapted to receive and guide melting portions of said confection down into said socket.

4. In an edible container for a confection, comprising a hollow socket for receiving one end of the confection, a lateral support for the body of the confection including a wall extending longitudinally from said socket and having side walls extending from opposite sides of said first wall and diverging from each other, said side walls converging together adjacent said socket, one side of said container being open throughout most of its length.

ARTHUR D. NIEDING.